United States Patent [19]

Budrikis et al.

[11] Patent Number: 4,745,567
[45] Date of Patent: May 17, 1988

[54] MOMENT GENERATOR

[75] Inventors: Zigmantas L. Budrikis, Dalkeith, Australia; Mehdi Hatamian, Old Bridge, N.J.

[73] Assignee: American Telephone and Telegraph Company AT&T Bell Laboratories, Murray Hill, N.J.

[21] Appl. No.: 697,244

[22] Filed: Feb. 1, 1985

[51] Int. Cl.[4] .............................................. G06F 7/38
[52] U.S. Cl. .................................................. 364/724
[58] Field of Search ................... 364/724, 733; 382/1, 382/41; 358/11–12, 125, 126

[56] References Cited

U.S. PATENT DOCUMENTS

| 4,023,019 | 5/1977 | Leibowitz et al. | 364/733 |
|---|---|---|---|
| 4,031,364 | 6/1977 | Wilmot | 364/724 |
| 4,127,865 | 11/1978 | Poetsch | 358/12 |
| 4,328,426 | 5/1982 | D'Ortenzio | 364/724 |
| 4,361,875 | 11/1982 | Hertz et al. | 364/724 |
| 4,393,456 | 7/1983 | Marshall, Jr. | 364/724 |
| 4,550,432 | 10/1985 | Andersson | 382/1 |
| 4,569,030 | 2/1986 | Butterweck et al. | 364/724 |
| 4,590,582 | 5/1986 | Umemura | 364/724 |
| 4,602,285 | 7/1986 | Beaulier et al. | 364/724 |
| 4,605,950 | 8/1986 | Goldberg et al. | 358/12 |
| 4,670,773 | 6/1987 | Silverberg | 358/12 |

OTHER PUBLICATIONS

M. R. Teague, "Optical Calculation of Radiant Moments," *Applied Optics*, vol. 19, No. 8, pp. 1354–1356, Apr. 15, 1980.
A. P. Reeves, "A Parallel Mesh Moment Computer," *IEEE Proceedings of the 6th International Conference on Pattern Recognition*, vol. 1, pp. 465–467, 1982.
S. A. Dudani et al., "Aircraft Identification by Moment Invariants," *IEEE Transactions on Computers*, vol. C-26, No. 1, pp. 39–45, Jan. 1977.
T. T. Kanazawa, *The Application of Two Dimensional Moment Invariants to Image Signal Processing and Pattern Recognition* (Thesis), Air Force Institute of Technology/GEO/P11/80-7 (Approved for Public Release AFR 190-17), Jan. 14, 1981.

Primary Examiner—Gary V. Harkcom
Assistant Examiner—Long T. Nguyen
Attorney, Agent, or Firm—Frederick B. Luludis

[57] ABSTRACT

The generation of individual moments of an image is advantageously achieved by generating a plurality of filtered signals in which each filtered signal is a linear combination of individual ones of the desired moments rather than the actual moment themselves. These filtered signals are obtained by passing the image signals through a series of single pole digital filters arranged as a matrix of filters. Each moment is formed at the end of an image frame by dematrixing the filtered signals. An illustrative embodiment uses repeating circuit patterns so that it can be easily integrated onto a circuit chip.

20 Claims, 2 Drawing Sheets

MOMENT GENERATOR

FIELD OF THE INVENTION

The present invention relates to the field of moment generators, and, in particular, to a moment generator for generating the first through $i,j^{th}$ moments of an image.

BACKGROUND OF THE INVENTION

The art of extracting features from an image, such as an image displayed on a cathode ray tube (CRT), is important in the field of pattern recognition and image processing. In this art, it is becoming increasingly important that such pattern recognition be done rapidly and accurately. To achieve speed and accuracy, the art has turned toward the method of moment generation, which is a familiar function in the art of mechanics. Moments are useful descriptors unique to the shape of a particular image, such as the centroid of the intensity pattern of an image. Unfortunately, known moment generators typically suffer from time inefficiencies related to multiplicative and exponential operation or suffer from being too expensive and complex to integrate onto a circuit chip.

One such moment generation arrangement is disclosed in the publication by M. R. Teague entitled "Optical Calculation of Radiant Moments", *Applied Optics*, Vol. 19, No. 8, pp. 1354–1356, Apr. 15, 1980. There the arrangement uses mirrors, lenses, beam splitters and photodetectors to optically generate the moments of an image. This arrangement, however, is expensive to implement and suffers from the time consuming problem of aligning the optical apparatus to obtain the moments of the subject image.

Another moment generator arrangement is disclosed in the publication by A. P. Reeves entitled "A Parallel Mesh Moment Computer", *IEEE Proceedings of the 6th International Conference on Pattern Recognition*, Vol. 1, pp. 465–467. There a triangular matrix of processing elements are used to generate a set of moments of order three. Each processing element in the matrix generates a single moment and includes an arithmetic logic unit and local memory for storing moment values and constant coefficients. This arrangement, however, is also expensive to implement since each processing element is essentially a microcomputer programmed to only generate a single moment.

SUMMARY OF THE INVENTION

Prior approaches to generating moments, especially higher-order moments, are unwieldy to use and to implement. We believe that this unwieldiness stems from the fact that the prior art generates each moment directly from the inputted sequence of signals. We have recognized that the generation of any order of moments is easily achievable by generating signals in which the value of each signal is a predetermined function of individual ones of the desired moments of the sequence of inputted signals, rather than the moments themselves. As such, it is a simple matter to dematrix these signals to form the desired moment, or moments. We have further recognized that these signals can be generated using a plurality of filter stages, which can be arranged to provide any order of signal, and in turn, any order of moment that is desired. We have still further recognized that each filter stage can be a single pole filter having no zeros, which results in repeating circuit patterns that can be easily integrated onto an integrated circuit chip.

BRIEF DESCRIPTION OF THE DRAWING

The solution to the above mentioned problems, together with the operation and practice of our invention will be more readily understood from the following description read in conjunction with the drawing, in which.

DETAILED DESCRIPTION

Figure 1:
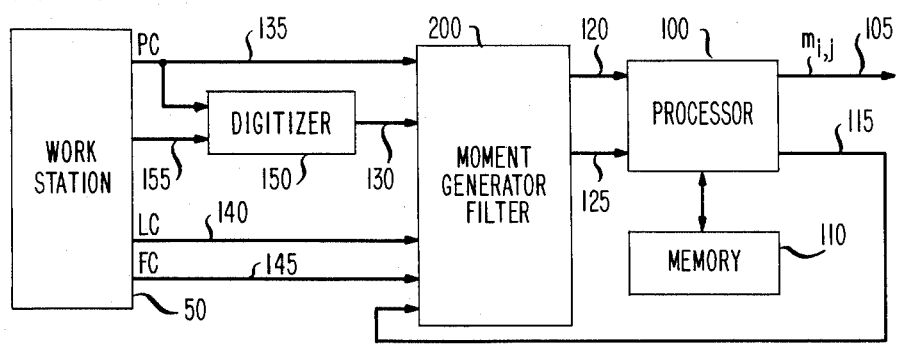
FIG. 1 is a block diagram of an image processing system in which the invention may be practiced.

The prior art appears to be contented to use complex integrations and/or multiplications to generate the moments of a sequence of signals. These prior approaches seem to be inseparable from the notion that each moment should be generated directly, thereby necessitating complex calculations and/or circuitry. In accordance with the present invention, by contrast, we have discovered that it is much simpler and easier to generate signals which are functions of the moments rather than generating the actual moments themselves and to then dematrix these signals to form the actual moments.

Specifically, in our arrangement, we generate a plurality of signals in which, in accordance with the invention, each signal is a function—illustratively, a linear combination—of individual ones of the first through $i^{th}$ order moments of the signal sequence whose moments are to be found. For example, the signals $y^0$ through $y^3$, which we call line filtered signals and which are generated over a sequence, or line, of inputted signals, are, in typical embodiments, linear combinations of moments as follows:

$$y^0 = m_0 \tag{1}$$

$$y^1 = m_1 + m_0 \tag{2}$$

$$y^2 = \tfrac{1}{2}m_2 + 3/2_1 + m_0 \tag{3}$$

$$y^3 = 1/6 m_3 + m_2 + 11/6 m_1 + m_0 \tag{4}$$

In our notation, the term $y^i$ (where $i = 1, 2, 3 \ldots M$) is the $i^{th}$ line filtered signal taken over a sequence of input signals, such as one scan line of pixel signals of an image, and $m_i$ is the $i^{th}$ order one-dimensional moment for that sequence of signals. It is seen from equations (1) through (4) that each line filtered signal is a linear combination of individual moments, with the line filtered signal $y^0$ as a special case, being actually equal to the moment $m_0$.

To dematrix these filtered signals to form the actual moments themselves, equations (1) through (4) can be algebraically rearranged in terms of the actual moments ($m_i$), as follows:

$$m_0 = y^0 \tag{5}$$

$$m_1 = y^1 - y^0 \tag{6}$$

$$m_2 = 2y^2 - 3y^1 + y^0 \tag{7}$$

$$m_3 = 6y^3 - 12y^2 + 7y^1 - y^0 \quad (8)$$

We have further recognized that this approach may be used to generate two-dimensional moments, for example, to generate the moments of an image represented by a plurality of sequences of image signals, or pixels, taken over a frame of the image. In this approach, we generate, in accordance with the invention, signals, or values, which are functions—illustratively, linear combinations—of the line filtered signals ($y^i$). Each such signal is thus a linear combination of a linear combination of each inputted sequence of a frame of signals, moment the filter will have i zeros and a pole of order $i+1$ located at $Z=1$. We have found that implementing such filters to generate the moments is unwieldy, at least for higher order filter stages. We have recognized, however, that if the zeros are deleted from the transfer function, then we nonetheless still do have something that, as is shown below, is a function of the moments and is less unwieldy to implement.

In particular, the resulting all-pole filter, which has a transfer function of $1/(Z-1)^{i+1}$ in the Z-domain, is readily realized as a cascade of $i+1$ first-order stages, as will be shown in conjunction with Table 1.

TABLE 1

| Moment Order | Impulse Response | Transfer Function | All-pole Transfer Function | All-pole Impulse Response |
|---|---|---|---|---|
| i | h(n) | H(z) | H(z) | h(n) |
| 0 | u(n) | $\frac{z}{z-1}$ | $\frac{1}{z-1}$ | u(n − 1) |
| 1 | nu(u) | $\frac{z}{(z-1)^2}$ | $\frac{1}{(z-1)^2}$ | (n − 2)u(n − 2) + u(n − 2) |
| 2 | $n^2$u(n) | $\frac{z(z+1)}{(z-1)^3}$ | $\frac{1}{(z-1)^3}$ | $\frac{1}{2}(n-3)^2 u(n-3) + \frac{3}{2}(n-3)u(n-3) + u(n-3) + \frac{1}{2}(n-2)u(n-2)$ |
| 3 | $n^3$u(n) | $\frac{z(z^2+4z+1)}{(z-1)^4}$ | $\frac{1}{(z-1)^4}$ | $\frac{1}{6}(n-4)^3 u(n-4) + (n-4)^2 u(n-4) + \frac{11}{6}(n-4)u(n-4) + u(n-4)$ $\frac{1}{2}(n-3)^2 u(n-3) + \frac{1}{3}(n-3)u(n-3)$ | which we refer to as a frame filtered signal $y^{ij}$ (where i denotes the order of the inputted line filtered signal and where j denotes the order of the moment, $j = 1, 2, 3 \ldots N$). Although, as will be seen below, the frame filtered signals may turn out to be the actual frame moments ($m_{i,j}$) themselves, each frame filtered signal is, in the general case, a linear combination of at least two of the frame moments ($m_{i,j}$), rather than being the actual moments.

We have further recognized that a plurality of digital filter stages each having a single pole and no zeros can be used, in accordance with a feature of the invention, to efficiently generate the line filtered signals $y^i$. We have also recognized that individual groups of single pole filter stages can be used to efficiently generate the frame filtered signals $y^{ij}$ from the line filtered signals.

The theoretical underpinnings of the invention will now be discussed. If the sequence x(n), where $n = 0, 1, \ldots N$, is applied to the input of a digital filter of impulse response $h(n) = n^i u(n)$, then from the convolution theorem the output will be:

$$y(n) = \sum_{k=0}^{n} x(k)(n-k)^i$$

If this equation is evaluated at $n = N$, as shown by the following expression, $$Y(N) = \sum_{k=0}^{N} x(k)(N-k)^i$$

the result is the $i^{th}$ order moment of x(n) about the point $n = N$. For $i = 0$ this can be implemented using a filter having the transfer function $Z/Z-1$ in the Z-transform domain. For higher order moments, i.e., moments for which $i \geq 1$, the filters are progressively more complex as can be seen from Table 1. In general, for the $i^{th}$ order It is seen from column 4 of Table 1 that, in accordance with a further feature of the invention, a filter can be easily implemented by cascading $i+1$ first-order filter stages, which we call a row of filters. The consequence of not using the zeros of the filter is that, for most moments, the output of the $i^{th}$ filter stage will be a linear combination of the first through $i^{th}$ order moments, rather than the actual $i^{th}$ order moment.

It, of course, remains to be shown that a row of single-pole digital filters does actually provide the line filtered signals $yi$. In particular, the linear combination of moments outputted by a particular filter can be determined by evaluating the output of the digital filter at $n = N + i + 1$, where N is the length of the sequence and i is the order of the moment. For example, the impulse response of a third-order line filter (i.e., the third-order section of a plurality of filter stages) is shown as the last impulse response in the fifth column of Table 1. If the output of a filter having this response and an input K(n), $n = 0, 1, \ldots N$ is evaluated at $N + 4$, the result is:

$$y^3 = 1/6 m_3 + m_2 + 11/6 m_1 + m_0$$

which is identical to equation (4) above and which shows that the output of the third-order filter is a linear combination of the zeroth, first-, second- and third-order line moments that have been accumulated over a sequence of signals. The linear combination of moments included in the outputs of row filter stages $y^0$ through $y^2$ can be similarly established and will be identical to equations (1) through (3), respectively.

The concept of using single-pole filters can be employed to generate two- or higher dimensional moments in which a row of digital filters is used to generate the one-dimensional signals $yi$ and in which columns of digital filters, each associated with a particular row filter stage, are used to generate two-dimensional signals $y^{ij}$ over a frame of an image. As discussed in our article, "Moment Calculations by Digital Filters", *AT&T Bell Laboratories Technical Journal,* February 1984, Vol. 63, No. 2, pp. 217-229, which is hereby incorporated by reference, each such column filter can also be realized using single pole stages.

Because the outputs of the row filters are a linear combination of the moments of a line, or sequence, of signals, which are then supplied to a corresponding column filter, the output from each column filter will also be a linear combination of the inputted linear combination. What this means is that the dematrixing equation for each column filter can be developed based on the linear combination of moments that is inputted to the column.

For example, the dematrixing equation for a particular column filter is derived based on the response of that filter. If the column filter is, for example, the second filter of the fourth column of filters, its response would be the second impulse response shown in column 5 of Table 1. This response is then evaluated at $n=N+3$ with $y^3$ being the inputted signal. To obtain the filtered signal $y^{23}$ the response of the filter is simply evaluated as follows:

$$y^{23} = \frac{1}{6} \text{ third order moments of } \left( \frac{1}{2} m_2 + \frac{3}{2} m_1 \bigg| + m_0 \right) +$$

$$\text{second order moments of } \left( \bigg| \frac{1}{2} m_2 + \frac{3}{2} m_1 \bigg| + m_0 \right) +$$

$$\frac{11}{6} \text{ first order moments of } \left( \frac{1}{2} m_2 + \frac{3}{2} m_1 \bigg| + m_0 \right) +$$

zero order moment of $$\left( \frac{1}{2} m_2 + \frac{3}{2} m_1 + m_0 \right)$$

If this approach is applied to each column filter of a moment filter having, for example, at least four columns of filters of four filters each, it can be shown that, for this arrangement, the signals outputted by the column filters will be a predetermined function of individual moments.

The dematrixing of the frame filtered signals to form the individual moments is a trivially implemented operation involving simple algebraic expressions. In fact, this operation can be simplified by storing the constants in memory as a matrix of constants and by storing the frame filtered signals in memory as a matrix of signals as they are received. The individual two-dimensional moments are then easily formed by multiplying the matrix of constants and the matrix of signals. It is to be understood by the art, that, in accordance with the invention, the signals outputted by a moment generator comprised of filters having poles and zeros, i.e., filters implemented using the transfer functions shown in column 3 of Table 1, would be the actual values of the moments and would not require dematrixing.

Referring now to FIG. 1, there is shown an illustrative example of an image processing system in which the invention may be practiced. Workstation 50, which typically can be the Sun Workstation manufactured by Sun Microsystems, Inc., supplies pixel signals to digitizer 150. The digitizer, which is an analog to digital converter, accepts the pixel signals and supplies a digital version of these signals to moment generator filter 200. The moment generator filter processes the pixel signals it receives and outputs frame filtered signals $y^{ij}$ to processor 100 at the end of the frame. Processor 100 dematrixes the frame filtered signals to form moments $m_{i,j}$.

In particular, the pixel signals supplied by workstation 50 illustratively represent an image displayed on a CRT contained within workstation 50. Workstation 50 scans images from left to right and top to bottom with a resolution of M lines of N pixels each. The time period between two pixels is T and the time period between two scan lines is T'. Therefore, the function $f(mT'+nT)$ represents the intensity of an image at the $n^{th}$ pixel point located on the $m^{th}$ line. This pixel signal is extended from workstation 50 to digitizer 150 over bus 155, which converts these signals into digital signals, or digital pixels, and then supplies the resultant digital signals to digital moment generator filter 200 via bus 130. Moment filter 200 accumulates the digital pixel values as they arrive every T seconds.

Workstation 50 also supplies a plurality of clock signals to moment filter 200, namely, a pixel clock signal (PC) via lead 135, which is pulsed each time a pixel value is supplied to digitizer 150, a line clock signal (LC) via lead 140, which is pulsed at the end of each scan line and a frame clock signal (FC) via lead 145, which is pulsed at the end of each image frame. Clock signal PC is also supplied to digitizer 150.

The structure and operation of digital moment filter 200 will be explained in detail below in connection with FIGS. 2 and 3. For the present, it suffices to state that at the end of each image frame, moment filter generator 200 supplies a delayed version of the frame clock signal FC to processor 100 via lead 125. When it receives this signal, processor 100 addresses digital moment filter 200 via address bus 115 to obtain the two-dimensional frame filtered signals via multibit bus 120. Processor 100, upon performing its dematrixing function, can, for example, either supply the resulting two-dimensional moments of the inputted signals to an application processor via bus 105 or can store them in memory 110 for further processing.

Figure 2:
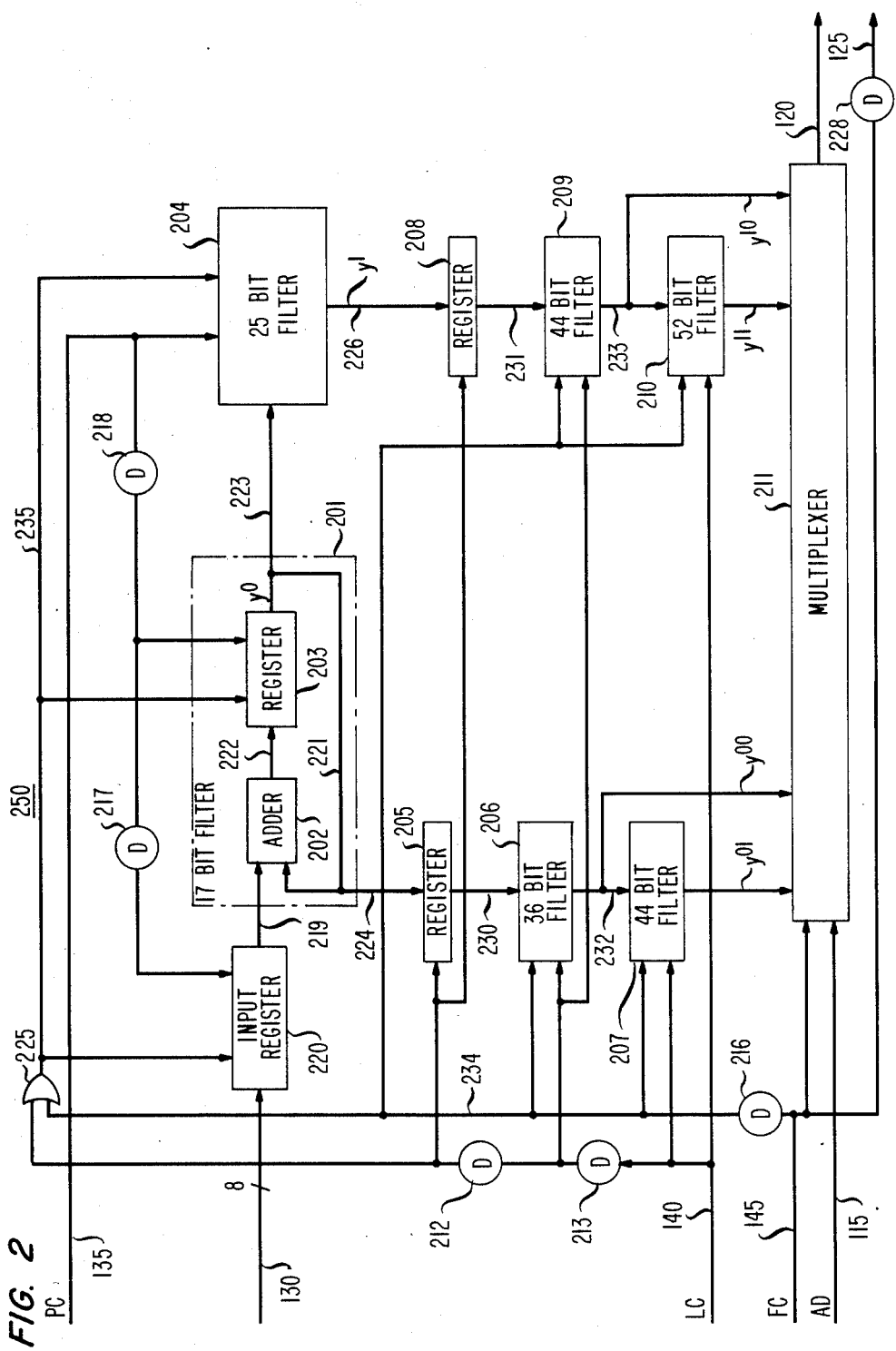
FIG. 2 is a block diagram of a moment generator filter used in the system of FIG. 1 embodying the principles of our invention.

FIG. 2 illustrates one embodiment of a moment filter generator which can be used for moment generator filter 200 shown in FIG. 1. Moment generator 250 shown in FIG. 2 is arranged, in accordance with a feature of the invention, to output frame filtered signals $y^{00}$, $y^{01}$, $y^{10}$, and $y^{11}$. It includes a row of filter circuits 201 and 204, a column of filter circuits 206 and 207, which receives the output of filter 201, and a column of filter circuits 209 and 210, which receives the output of filter 204. Each filter 201, 204, 206, 207, 209 and 210 is illustratively a single pole filter of infinite impulse response that may be implemented using a recursive circuit. Row filter 201, for example, recursively adds each pixel signal inputted via bus 130 and input register 220 to form line filtered signal $y^0$. Row filter 204 similarly recursively adds each signal outputted by row filter 201 to form line filtered signal $y^1$. At the end of a line of pixel signals, row filter 201 (204) passes line filtered signal $y^0$ ($y^1$) to column filter 206 (209) which recursively adds this signal each time it receives it over a frame of pixel signals to form frame filtered signal $y^{00}$ ($y^{10}$). In a like manner, column filter 207 (210) recursively adds each output from column filter 206 (209) to form frame filtered signal $y^{10}$ ($y^{11}$) at the end of a frame. The values represented by the frame filtered signals are stored in multiplexer 211, which multiplexes them to bus 120 in response to addresses on address bus 115. As shown in FIG. 2, the processing capability of each succeeding row filter and of each succeeding column filter increases illustratively by 8 bits, since the value accumulated by each filter is larger than the value accumulated by the preceding filter. For example, row filter 201 is capable of accumulating a 17 bit value, whereas row filter 204 is capable of accumulating a 25 bit value.

Structurally, row filter 201, for example, includes adder 202 having a first input connected to bus 219 for receiving digital pixel signals from input register 220 and includes register 203 which receives values in the form of signals from adder 202 via bus 222. A value contained in register 203 is supplied to bus 223 and it is also supplied to a second input to adder 202 via feedback bus 221, thereby effecting an accumulation of digital pixel signals inputted to the filter. Filters 206, 207, 209 and 210 are of similar construction.

As each digital pixel value is received via bus 130, the value contained in each row filter adder is first transferred to its associated register circuit where it is outputted to a next row filter before the adder is allowed to receive its next input. This process continues for each row filter until all of the N pixel points of an image line are recursively accumulated into line filtered signals $y^0$ and $y^1$. This mode of operation is achieved by using delayed versions of the pixel clock signal on lead 135 to clock the various filters and input register 220.

Specifically, each pixel clock signal is inputted directly to filter 204, but it is delayed by delay circuit 218 before it is inputted to row filter 201 and it is again delayed by delay circuit 217 before it is inputted to input register 220. When the pixel clock signal is inputted to row filter 204, it clocks the value contained in the filter 204 adder into the filter 204 register. When the pixel clock signal is inputted to row filter 201, it clocks the value contained in adder 202 into register 203 via bus 222. Register 203 then supplies this value to bus 223 and to the second input of adder 202 via bus 221. The value supplied to bus 223 by register 203 is not clocked into filter 204, since the pixel clock signal inputted to filter 204 has, by this time, decayed to the point where it cannot perform the clocking function. When the pixel clock signal is outputted by delay circuit 217, it clocks the digital pixel signal on bus 130 into input register 220. The digital pixel signal contained in register 220 is then supplied to adder 202 where it is added with the signal on feedback bus 221.

During the video blanking period, at which time the image display system has completed scanning an image line and is retracting to the next line, an additional pixel clock signal is supplied to moment filter 250. This pixel clock signal clocks the final line value, or accumulation, contained in each row adder, such as row adder 202, to its corresponding row register, such as register 203. As will be explained below, line clock signal LC supplied to moment filter 250 during the retrace period transfers the accumulation stored in each row register, such as row register 203, to a corresponding one of the column registers 205 and 208 via buses 224 and 226, respectively. The line filtered signals received by each column register at the end of each scan line are supplied to corresponding column filters, which recursively sum these signals over one frame of a displayed image.

In particular, the mode of operation of the column filter is achieved by using delayed versions of the line clock signal on lead 140 to clock the various column filters and column registers. Each line clock signal LC is applied directly to column filters 207 and 210 via lead 140. However, it is delayed by delay circuit 213 before it is applied to column filters 206 and 209. It is further delayed by delay circuit 212 before it is applied to column register circuits 205 and 208. Line clock signal LC also passes from delay circuit 212 to OR gate 225 which clears input register 220 and row filter circuits 201 and 204 via lead 235.

The delayed version of the LC signal appearing at the output of delay circuit 213 similarly clocks the contents of column registers 205 and 208 into column filters 206 and 209, respectively. The accumulations contained in column filters 206 and 209 are clocked into column filters 207 and 210, respectively, by the LC signal appearing on lead 140. It is seen, therefore, that each column of filters recursively accumulates line filtered signals $y^0$ and $y^1$, respectively, when these values are clocked to their respective column registers.

At the end of an image frame, an additional line clock signal LC is supplied to moment filter 250. This signal and its delayed version, as it appears at the output of delay circuit 213, clock the final summation contained in each column filter adder circuit into an associated column register (not shown) for outputting to busses $y^{00}$ through $y^{11}$, respectively. After supplying the additional line clock signal, the image display system, as mentioned above, also supplies frame clock signal FC to moment filter 250 via lead 145 which clocks the values, or frame filtered signals, contained on busses $y^{00}$ through $y^{11}$ into a register contained within multiplexer 211. The delayed version of the frame clock signal that is outputted by delay circuit 216 clears column filters 206, 207, 209 and 210 via lead 234 and also clears row filters 201 and 204 via OR circuit 225 and lead 235.

As mentioned above, the frame clock signal FC present on lead 145 is also supplied to processor 100 via delay circuit 228 and lead 125. When it receives the delayed version of the frame clock signal, processor 100 addresses multiplexer 211 via address bus 115 to obtain the column values stored in multiplexer 211. Multiplexer 211 may be arranged to output 16 bits of data to bus 120 each time it receives a data address via bus 115 and a clock signal via a clock lead (not shown). In this manner, processor 100 repeatedly addresses multiplexer 211 to obtain frame filtered signals $y^{00}$ and $y^{11}$. Upon receiving all of these signals from multiplexer 211, processor 100 stores them in memory 110 (FIG. 1) and, as will be explained, dematrixes them, if required, to form moments $m_{00}$ through $m_{11}$. It is, of course, seen from Table 2 that frame filtered signals $y^{00}$, $y^{01}$, $y^{10}$ and $y^{11}$ are equal to the actual moments and, therefore, in the case of FIG. 2, processor 100 does not have to dematrix them.

In accordance with a feature of the invention, higher-order moments in two-dimensional arrays can be provided by using a moment filter of the general type shown in FIG. 2 arranged to provide higher-order frame filtered signals $y^{00}$ through $y^{nn}$. Also, the dimensionality of the array can be increased beyond two. Thus, a three-dimensional array would have stacks of filters, again of single-pole sections, extending from each of the column sections. The outputs from the column sections would be inputted to their stacks once every frame and would be accumulated in the stacks over a superframe, equal to a multiple of ordinary frames. Multiplexing, transferring of results to the processor and resetting of stack registers would be done analogously to the two-dimensional case.

Relations between $y^{i,j}$... and $m_{i,j}$... exist similarly for higher orders and higher dimensionality. In all cases dematrixing of filtered signals to obtain moments would be by calculations as shown for $y^{23}$, or its analogous extension beyond two dimensions and beyond n of 3. A third-order two-dimensional filter, for example, comprises 4 row filter sections and four columns of 4 filter sections each. A third-order three-dimensional filter would additionally comprise 16 stacks of 4 filter sections each. As mentioned above, the size of the registers in the individual sections increases by 8 bits along the row, column and stack. Also, additional delay circuits may be required to ensure that the accumulations in the sections are only passed at the appropriate instants of time.

Figure 3:
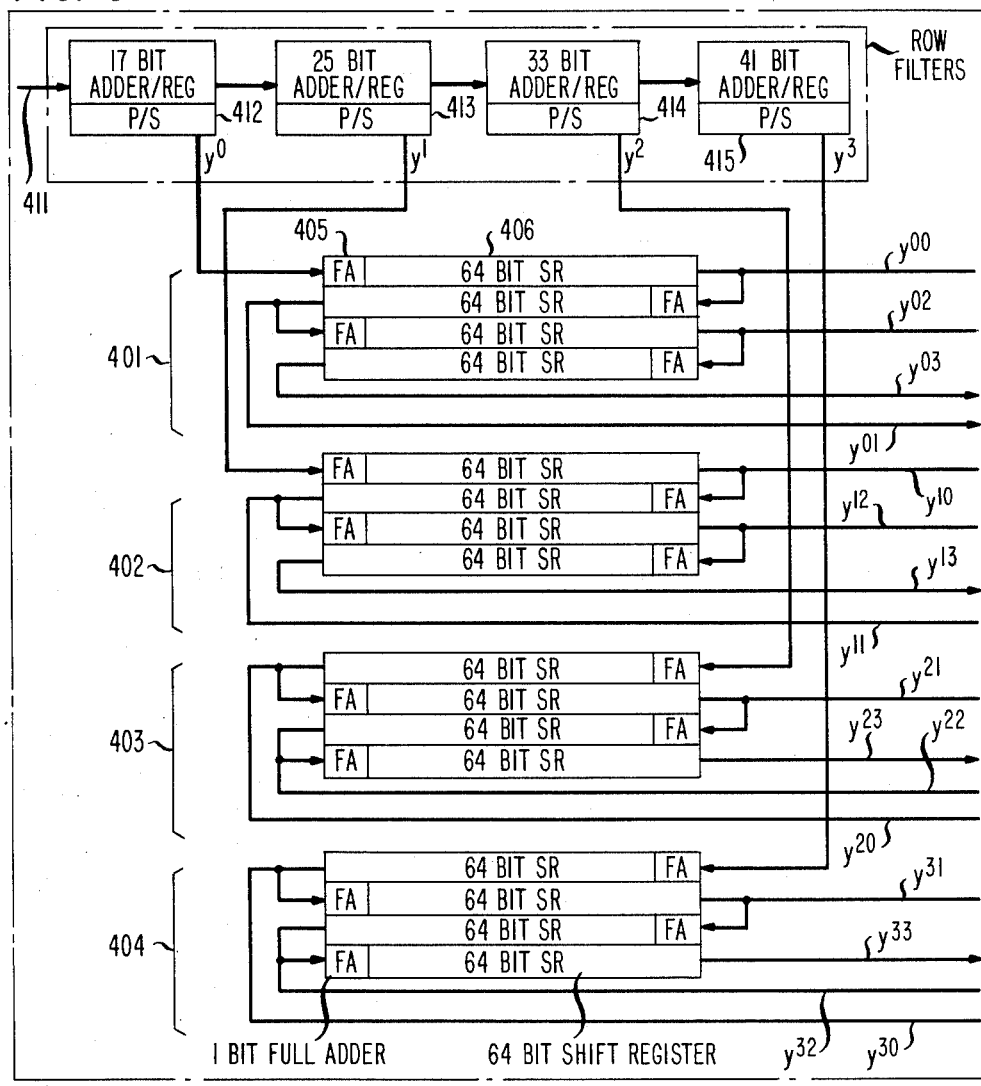
FIG. 3 is a block diagram of a moment filter integrated circuit embodying the principles of our invention which can also be used in the system of FIG. 1.

FIG. 3 is a block diagram of a third-order two-dimensional moment filter integrated circuit embodying the principles of the invention, which outputs frame filtered signals $y^{00}$ through $y^{33}$ and which can be used for moment generator filter 200, shown in FIG. 1. The integrated circuit layout is in the general form of a matrix and comprises four columns of filters 401 through 404 of four filters each, which receive line filtered signals $y^0$ through $y^3$ from row filters 412 through 415, respectively. For this circuit, we recognized that an efficient component layout can be achieved if the so-called column filters are stacked one "on top of" another, rather than arranging them in left-to-right columns, as was done in connection with the moment filter depicted in FIG. 2.

For clarity, various elements, such as the input register, clock signal leads and delay circuits, are not shown in FIG. 3. A multiplexer is not shown in FIG. 3 since, as an alternative to the approach shown in FIG. 2, this function can be readily performed by an external processor. If desired, however, a multiplexer could be easily provided within the circuit of FIG. 3 to multiplex frame filtered signals $y^{00}$ through $y^{33}$ to an output terminal.

The circuit shown in FIG. 3 employs serial transmission of data between each filter of each column of filters 401 through 404 and employs parallel transmission of data between row filters 412 through 415. Each row filter 412 through 415 has at its output a parallel-to-serial (P/S) converter which converts the parallel output of a respective row filter to a serial bit stream before it is passed to its corresponding column of filters. To make the circuit readily integratable by repeating circuit patterns, the capacity of each filter of each column of filters is the same, illustratively 64 bits. Each column of filters, 401 through 404, comprises four 64-bit shift registers and each shift register, such as register 406, includes a one-bit adder, such as adder 405, at its input to constitute a 64-bit accumulator. As shown in FIG. 3, the output of each 64-bit register is connected to a respective output terminal, which can be serially accessed by a processor, such as processor 100, using known multiplexing techniques to obtain the filtered outputs. The processor can then dematrix the filtered outputs in accordance with the dematrixing equations shown for $y^{23}$.

The method of moment generation has been used to improve the accuracy of locating the position of a light-pen when it is in proximity to the face of a CRT screen. However, as pointed out above, prior methods of moment generation are unwieldy and employ circuitry which is far from compact. Accordingly, a particular advantageous application of the invention is to generate, in accordance with the invention, the moments that are needed to pinpoint the location of a light-pen using the compact circuitry disclosed above. In fact, this circuitry can be inserted into the light-pen housing, thereby providing an arrangement which is both compact and inexpensive.

Conventional light-pens used in computer graphics systems use a photosensor placed in the tip of the light-pen. The photosensor outputs a "hit" pulse whenever the CRT electron beam falls within the field of view of the photosensor. An X-counter and a Y-counter track the x and y coordinates of the electron beam as it sweeps across the face of the CRT screen. When the photosensor indicates a hit, the values contained in these counters are used to estimate the position of the hit on the face of the CRT screen. Using this simple thresholding technique, the accuracy in estimating the position of the light-pen is a function of the photosensor's signal-to-noise ratio and its aperture (size of the field of view), the latter being more important. Over the years, many attempts have been made to improve the accuracy of the light-pen by controlling the field of view of the pen and by using highly sensitive photosensors. These attempts, however, have not achieved the desired accuracy of pin-pointing the location of the light-pen on the CRT screen.

As mentioned above, the moments generated by our invention can be used to provide a highly accurate estimate of the location of a light-pen when it touches a CRT screen, such as the CRT screen used in the Sun Workstation without using unwieldy circuitry. In this arrangement, the circuit shown in FIG. 1 is modified so that the analog signals outputted by the light-pen are supplied to digitizer 150 rather than the pixel signals from workstation 50. Digitizer 150 passes a digital version of these signals to moment filter 200. Frame filtered signals outputted by filter 20 are dematrixed by processor 100 to form moments $m_{00}$, $m_{01}$ and $m_{10}$, which are then used to accurately determine the x and y coordinates of the image pattern that is seen by the light-pen using the following equations:

$$x = m_{10}/m_{00}$$

$$y = m_{01}/m_{00}$$

The values of x and y are passed from processor 100 to workstation 50, which then, for example, illuminates the CRT at the point that is touched by the light-pen.

CONCLUSION

Although a specific embodiment of our invention is shown and described herein, such merely illustrates the principles of the invention. Those skilled in the art will be able to devise other arrangements which, although not specifically shown or described herein, embody those principles and which do not depart from their spirit and scope. For example, the dematrixing function described herein could be easily performed by the moment generator filter itself by using special purpose hardware, such as multipliers, adders and subtractors, to implement the dematrixing equations. Further, the moment generator may be implemented using filters having both poles and zeros.

What is claimed is:

1. A moment generator for generating at least one moment of a sequence of inputted signals, said generator comprising:

means for generating a plurality of filtered signals from said inputted signals, each of said filtered signals being a predetermined function of individual moments of said sequence, and means for dematrixing said filtered signals to generate said at least one moment.

2. The moment generator set forth in claim 1 wherein said filtered signal generating means includes a plurality of filtering means, each of said filtering means recursively accumulating signals supplied to its input and outputting a resulting signal to a next one of said filtering means, a first one of said filtering means receiving said sequence of inputted signals at its input and other ones of said filtering means each receiving at its input the signal outputted by a respective preceding one of said filtering means.

3. The moment generator set forth in claim 2 wherein each of said filtering means is a single-pole digital filter having no zeros.

4. The moment generator set forth in claim 3 wherein said single-pole digital filter is a recursive circuit for recursively adding signals newly inputted thereto to an accumulation of signals priorly inputted thereto.

5. The moment generator set forth in claim 1 wherein said dematrixing means includes a processor for generating said at least one moment in accordance with a predetermined dematrixing equation.

6. A moment generator filter for generating from a sequence of inputted signals a plurality of filtered signals $y^{ij}$, $i=1, 2, 3 \ldots M$, $j=1, 2, 3 \ldots N$, M and N being predetermined integers, said generator comprising:

means for filtering said sequence of inputted signals into a plurality of signals $y^i$, individual ones of said plurality of signals $y^i$ being respective predetermined functions of individual moments $m_i$ of said sequence of inputted signals, and means for filtering said signals $y^i$ into said plurality of signals $y^{ij}$, individual ones of said plurality of signals $y^{ij}$ being respective predetermined functions of individual moments $m_{i,j}$ of said sequence of inputted signals.

7. A moment generator for generating individual moments of an image from a sequence of image signals, said generator comprising:

a plurality of filtering means, each of said filtering means recursively accumulating signals supplied to its input and outputting a resulting signal to a next one of said filtering means, a first one of said filtering means receiving said sequence of image signals at its input and other ones of said filtering means each receiving at its input said resulting signal outputted by a respective preceding one of said filtering means, the resulting signals outputted by each of said filtering means following the accumulation of said sequence of image signals each being a respective predetermined function of individual moments of said sequence of image signals, and means for generating each of said individual moments as a function of respective ones of said resulting signals.

8. The moment generator set forth in claim 7 wherein each of said filtering means is a digital filter having a transfer function of $1/Z-1$ in the Z-transform domain.

9. The moment generator set forth in claim 8 wherein said digital filter comprises at least an adder circuit having first and second inputs and an output and a register circuit having an input and an output, said adder output being connected to said register input and said register output being connected to one of said adder circuit inputs.

10. The moment generator set forth in claim 7 wherein said generating means includes a processor, said processor generating each of said individual image moments in accordance with a respective dematrixing equation.

11. The moment generator set forth in claim 10 wherein particular ones of said individual image moments are used by said processor to determine the position of at least a particular one of said image signals within a frame of said image signals.

12. A moment generator circuit for generating individual moments of an image, said image being represented by a frame of sequences of image signals, said circuit comprising:

a plurality of filtering means for providing a plurality of frame filtered signals, individual ones of said frame filtered signals being respective predetermined functions of individual ones of said image moments, ones of said filtering means being used to filter each sequence of said frame of sequences into line filtered signals, and other ones of said filtering means being used to filter said line filtered signals into said frame filtered signals, and means for generating said individual image moments as respective functions of individual ones of said frame filtered signals.

13. The moment generator circuit of claim 12 wherein each of said filtering means is a single-pole digital filter.

14. The moment generator circuit of claim 12 wherein said ones of said filtering means comprise a row of cascaded digital filters and said other ones of said filtering means comprise individual columns of cascaded digital filters.

15. The moment generator circuit of claim 13 wherein said single-pole digital filter comprises at least an adder circuit having first and second inputs and an output and a register circuit having an input and an output, said adder output being connected to said register input and said register output being connected to one of said adder circuit inputs.

16. The moment generator circuit of claim 12 wherein said generating means includes a processor, said processor being adapted to generate each of said individual image moments in accordance with a respective dematrixing equation.

17. The moment generator circuit of claim 12 wherein said generating means includes means for determining the position of a particular image signal within said frame of image signals as a function of particular ones of said individual image moments.

18. A moment generator for generating individual moments of a sequence of inputted signals said generator comprising:

a plurality of cascaded single-pole digital filters for generating a plurality of filtered signals from said inputted signals, individual ones of said plurality of filtered signals being respective predetermined functions of said individual moments, and means for dematrixing each of said individual ones of said filtered signals to form respective ones of said individual moments.

19. A moment generator for generating at least one moment of a frame of sequences of image signals, said moment generator comprising:

a plurality of filtering means arranged into a row of filtering means and columns of filtering means, said row of filtering means being used to generate a plurality of line filtered signals from individual ones of said sequences of image signals, said columns of said filtering means being used to generate a plurality of frame filtered signals from individual ones of said line filtered signals, each of said frame filtered signals being respective predetermined linear combinations of individual moments of a frame of said image signals, and means for dematrixing at least an individual one of said frame filtered signals to generate said at least one moment.

20. A method of generating at least one moment of an image over a frame of image signals, said method comprising the steps of:

filtering each of said image signals of a line of image signals into line filtered signals, individual ones of said line filtered signals being respective linear combinations of individual moments of a line of said image signals, filtering individual ones of said line filtered signals into frame filtered signals over said frame of image signals, individual ones of said frame filtered signals being respective linear combinations of individual image moments of said frame of image signals, and generating said at least one image moment as a function of at least one of said frame filtered signals.

* * * * *